United States Patent [19]

Iwasaki

[11] Patent Number: 4,984,779

[45] Date of Patent: Jan. 15, 1991

[54] AUTOMATIC DOCUMENT CONVEYING DEVICE FOR ORIGINAL IN A TWO-SIDED COPY MACHINE

[75] Inventor: Yasuo Iwasaki, Kanagawa, Japan

[73] Assignee: Fuji Xerox Co., Ltd., Tokyo, Japan

[21] Appl. No.: 146,181

[22] Filed: Jan. 20, 1988

[30] Foreign Application Priority Data

Feb. 6, 1987 [JP] Japan .................. 62-024712
Feb. 12, 1987 [JP] Japan .................. 62-028177

[51] Int. Cl.$^5$ .................................. B65H 7/10
[52] U.S. Cl. .................................. 271/227; 271/251; 271/259; 271/186; 271/291; 271/902
[58] Field of Search ............ 271/227, 250, 251, 258, 271/259, 186, 291, 902

[56] References Cited

U.S. PATENT DOCUMENTS

| | | | |
|---|---|---|---|
| 4,043,549 | 8/1977 | Rinehart | 271/120 X |
| 4,278,344 | 7/1981 | Sahay | 355/14 SH |
| 4,319,833 | 6/1980 | Hidding | |
| 4,411,517 | 10/1983 | Gerken | 271/902 X |
| 4,477,068 | 10/1984 | Arter | 271/251 X |
| 4,526,309 | 7/1985 | Taylor | 271/250 X |
| 4,544,148 | 10/1985 | Katajima et al. | |
| 4,579,444 | 4/1986 | Pinckney et al. | |
| 4,621,801 | 11/1986 | Sanchez | |
| 4,714,241 | 12/1987 | Randall | |
| 4,723,772 | 2/1988 | Honjo et al. | |
| 4,727,398 | 2/1988 | Honjo et al. | |
| 4,750,727 | 6/1988 | Looney | 271/120 X |

FOREIGN PATENT DOCUMENTS

3622187A1 7/1986 Fed. Rep. of Germany .

OTHER PUBLICATIONS

IBM Technical Disclosure Bulletin, vol. 14, No. 5, (Oct. 1971), p. 1547.

*Primary Examiner*—Richard A. Schacher
*Attorney, Agent, or Firm*—Finnegan, Henderson, Farabow, Garrett, and Dunner

[57] ABSTRACT

An automatic document conveying device for copying dual-sided originals includes a first conveyance path for conveying documents from a document feeder to a platen through a U-shaped path and a second conveyance path for conveying documents from the platen to the beginning of the U-shaped path to invert the documents. A document edge alignment mechanism aligns the edge of each document conveyed through the first and second conveyance paths with a document edge alignment position on the platen.

24 Claims, 9 Drawing Sheets

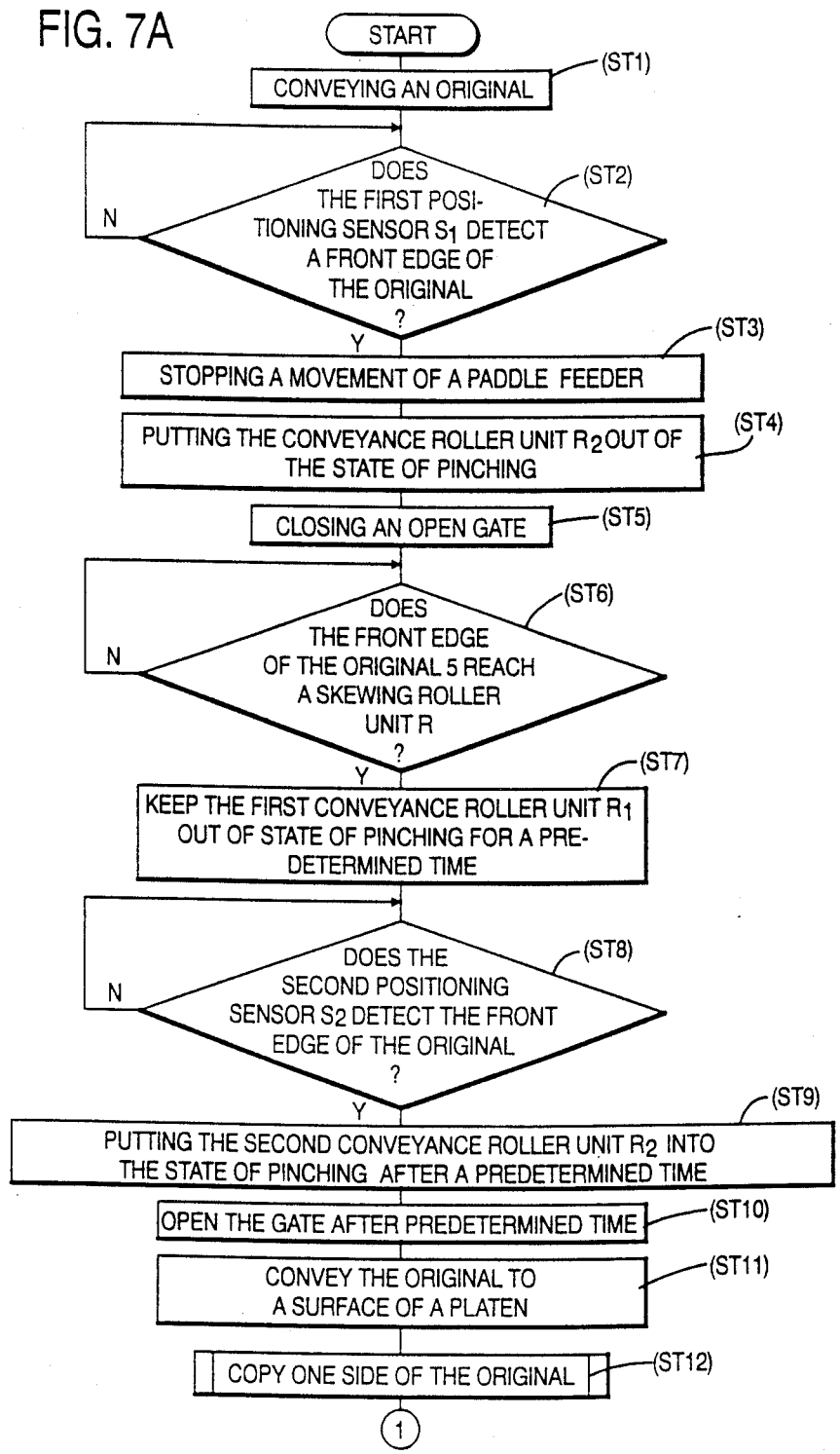

AUTOMATIC DOCUMENT CONVEYING DEVICE FOR ORIGINAL IN A TWO-SIDED COPY MACHINE

FIELD OF THE INVENTION

The present invention relates to an automatic conveyor for original documents in document imaging machine such as a duplex photocopying machine, and particularly relates to an improved automatic conveyor for an original document. The conveyor requires a short distance to invert a both-side duplex original after the scanning of one side in order to scan the other side.

BACKGROUND OF THE INVENTION

Conventional automatic conveyors for an original document in a duplex photocopy machine or the like are disclosed in Japanese patent applications (OPI) Nos. 23039/86 and 23040/86 (the term "OPI" as used herein means an "unexamined published application"). Each of the conventional automatic conveyors basically comprises an original sender for sending out, one by one, both-side originals put in an original housing section and a common, i.e., for one-side and both-side originals, conveyance means for conveying the original document sent out by the original sender toward an original document copying position on a platen. A both-side conveyance means removes the original document from the platen, inverts the original after one side has been copied, and conveys the original back to the original document copying position on the platen. A discharging conveyance means discharges the original document on the platen after the other side of the original has been copied.

In the conventional automatic conveyors described in the above applications, the front edge of the original document is aligned immediately before the original is moved into an original introducing section for the platen. The original is thereafter moved to the original copying position on the platen so that the image of the original is properly copied onto copying paper. However, since the width of each of the conveyance passages of the common conveyance means and the both-side conveyance means is provided with some allowance for the prevention of paper jamming or the like, the original is likely to be skewed while being conveyed by each of the conveyance means. Consequently, the side edge of the original is likely to be misaligned in the original copying position on the platen. Therefore, there is a problem that the position of the image of the original reproduced on the copying paper is likely to be somewhat misaligned.

Although the length of the conveyance passage of the common conveyance means from the original housing section to the platen does not need to be large, the length of the conveyance passage of the both-side conveyance means has been considerably greater because it is necessary to both remove the original from the platen and to invert the original by the both-side conveyance means. For that reason, the original is likely to be more skewed in the conveyance passage of the both-side conveyance means causing the position of the original to be misaligned on the copy.

Thus, in a conventional automatic duplex photocopy machine, a paper inverting mechanism or the like is provided at the paper conveyance passage of the copying machine so that after copying is performed on one side of the copy paper, the paper is inverted and conveyed to an image transfer section and an image is transferred to the other side of the paper. To this end, the conventional duplex photocopy machine is integrally provided with an automatic original conveyor so that the image of one side of an original placed on a platen by the automatic original conveyor is scanned, and the original is thereafter inverted and again placed on the platen by the automatic original conveyor so that the image of the other side of the original may be scanned and transferred to the other side of the paper.

In the automatic original conveyor disclosed in OPI No. 23040/86, an original conveyance belt unit 126 is provided over a platen 125, as shown in FIG. 14. The automatic original conveyor 101a functions so that an original 103 is sent out from the original housing tray 102 of the conveyor by an original sender 105 and conveyed to the platen 125 through a conveyance passage shown by arrows in FIG. 14. After the original is conveyed to the platen 125 by the original conveyance belt unit 126 and the image of one side of the original is scanned, the belt unit is driven in the reverse direction to convey the original to an inverting section 130 where it is inverted and then conveyed back to the platen through complicated passages to scan the image of the other side of the original. The original is then discharged to a discharge tray.

Another conventional automatic original conveyor is disclosed in Japanese patent application (OPI) No 8834/85. In the automatic original conveyor, a nearly U-shaped inverting passage is provided in the face of the end of a platen so that the original, the image of one side of which has already been scanned, is moved through the inverting passage as the original is discharged by an original conveyance belt unit. The original is moved through the inverting passage and is conveyed again to the platen by the original conveyance belt unit. The original is positioned on the platen so that the image of the other side of the original can be scanned to transfer the image to the reverse side of the paper, on the observe side of which the image of the former side of the original is already copied, to complete both-side copying.

In the above-described conventional automatic original conveyors, an exclusive inverting passage is provided separately from the common, i.e., original conveyance passage. For that reason, a passage for sending out the original from the original housing tray and the inverting passage are separately provided so that operational members are operated separately from each other. Therefore, the original conveyance passage and the inverting passage need to be provided with separate drive mechanisms, aligning units, control units and so forth. As a result, the structure of the automatic original conveyor is complicated and large in size. Since the inverting passage is relatively long, jamming is more likely to occur in the inverting passage, and the original conveyance passage and the control or the like of the operational members is complicated.

OBJECTS AND SUMMARY OF THE INVENTION

An object of the present invention is to provide an automatic document conveying apparatus that accurately aligns an original prior to both-side copying.

Another object of the present invention is to provide a simplified automatic document conveying apparatus for both-side copying.

Still another object of the present invention is to provide an automatic document conveying apparatus where conveyance means for the original document and for inverting the document share functional components.

A further object of the present invention is to reduce jamming in the conveyance path of an original document in a both-side copying device These and other objects are accomplished by an automatic document conveying device for use in a machine for copying both sides of two-sided original documents comprising an original document feeder means for serially feeding one-side and both-side original documents, a platen having an original copying position, a first conveyance means for conveying an original to the original copying position, a second conveyance means for removing from the platen an original positioned at the original copying position, for inverting the original responsive to the copying of one-side thereof, and for conveying the inverted original to the original copying position, a discharge conveyance means for discharging the original from the original copying position, and a side edge position aligning means provided in the second conveyance means to align a side edge of the document at the original copying position to a predetermined alignment position.

BRIEF DESCRIPTION OF THE DRAWINGS

The manner by which the above objects and other objects, features, and advantages of the present invention are attained will be fully apparent from the following detailed description when it is considered in view of the drawings, wherein:

FIGS. 7A and 7B is an operational flow diagram for the controller shown in FIG. 6;

DETAILED DESCRIPTION OF THE PREFERRED EMBODIMENTS

Figure 1:
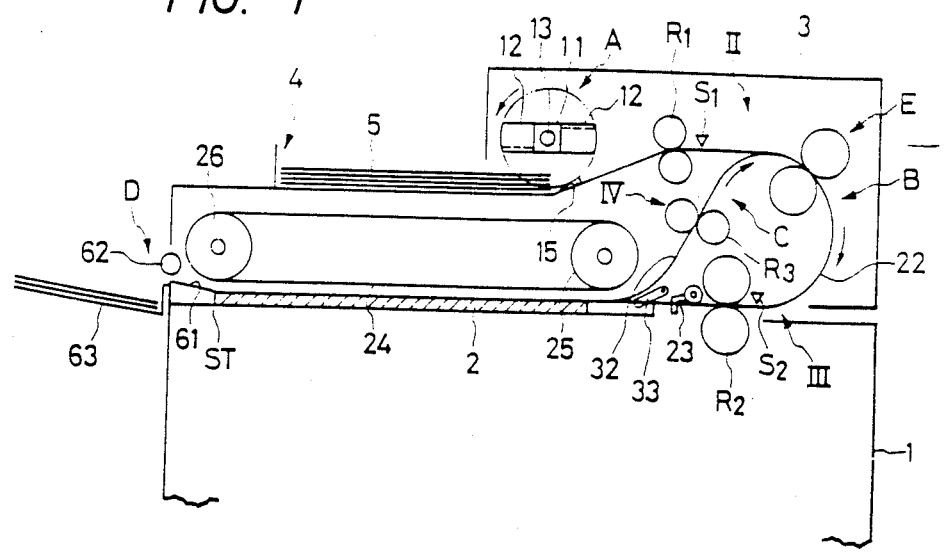
FIG. 1 is a schematic view of an embodiment of the automatic document conveying device of the present invention.

In the automatic document conveying device of the present invention, an original document sender serially feeds one-side or both-side originals from an original housing section. A one-side conveyance means conveys the originals toward the original copying position on the platen. A both-side conveyance means removes the original from the platen and inverts the original after an image is made of one side of the original set on the platen when the both-side copying cycle is selected. Thereafter, the original document is conveyed back to the original copying position on the platen. A discharging conveyance means discharges the original on the platen after completion of the copying operation for one or both sides of the original set on said platen. A side edge positioning means is provided at least on the conveyance passage of the both-side conveyance means to align the side edge of the original to the original copying position on the platen.

Although the location of the original housing section may be appropriately selected to be next to the side edge of the platen or over the platen, it is preferable to locate the original housing section over the platen, from a viewpoint of the reduction in the installation space for the automatic conveyer. Although the original document feeder may be appropriately selected to be a paddle-type feeder, a roller-type feeder or the like, it is preferable to design and position the original feeder to avoid smearing the surface of the original written with a pencil or the like. It is also preferable to provide a retarder in a position corresponding to that of the original feeder, to prevent the originals from being fed in an overlaid state.

The one-side conveyance means has an original conveyance passage between the original housing section and the original entrance portion of the platen. The original is conveyed by conveyance members appropriately disposed along the conveyance passage. After the front edge of the original is aligned by a gate member provided on the conveyance passage at the original entrance portion of the platen, the gate member is opened with prescribed timing so that the original is conveyed to the original copying position on the platen by a conveyance member such as a belt.

The both-side conveyance means has the original conveyance passage between the original exit portion and original entrance portion of the platen. After the original is removed from the original copying position on the platen and is conveyed in the original conveyance passage and inverted, the front edge of the original is aligned and the original is then conveyed back to the original copying position on the platen.

Although the original conveyance passage of the one-side conveyance means and the both-side conveyance means may be provided separately from each other, it is preferable to use in common as much of the original conveyance passages as possible to simplify the automatic original document conveying device. It is further preferable to share the use of a common gate member, original conveyance member over the platen, and other elements.

The both-side conveyance means needs to be provided with a means for inverting the original which may be constructed by an inverting mechanism provided midway on the original conveyance passage or by making the original conveyance member over the platen reversible. The inverting of the original document can thus be performed through appropriate modifications in design The discharging conveyance means may be made of rollers or the like of appropriate design so that the original already subjected to one-side or both-side copying can be discharged from the platen without smearing.

The side edge position alignment means has at least a position regulator for aligning the side edge of the original, and a guide for guiding the original to the position regulator. Appropriate modifications in design may be made to the form and location of the position regulator as far as the position regulator functions to properly align the side edge of the original. Although the guide may be basically provided only for aligning the original, a skewing roller slightly oblique to the position regulator or the like may be jointly used as the guide and as a conveyance member. The side edge position aligning means may be provided not only on the original conveyance passage of the both-side conveyance means but also on that of the one-side conveyance means. In that case, either two side edge position aligning means may be separately provided on the original conveyance passages of both the conveyance means or one side edge position aligning means may be provided on the common portion of the original conveyance passages of both the conveyance means.

In the automatic original document conveying device provided in accordance with the present invention, the side edge position aligning means is provided midway at least on the original conveyance passage of the both-side conveyance means so that the side edge of the original conveyed by the both side conveyance means is aligned with the position of the original on the platen. The original is thus conveyed properly to the original copying position on the platen.

FIG. 1 shows a duplex machine including the automatic original document conveying device of the present invention. The automatic original document conveying device is installed in a cover 3 that covers a platen 2 on the body 1 of the copying machine and can be opened and closed. The automatic original document conveying device comprises a document feeder such as a paddle feeder A for serially feeding both-side originals 5 from an original housing tray 4, a one-side conveyance means B for conveying the original 5 toward an original copying position ST on the platen 2 and both-side conveyance means C for removing the original 5 from the platen 2 and inverting the original after copying one side of the original set on the platen 2 in a both-side imaging cycle.

The inverted original is thereafter conveyed back to the original copying position ST on the platen 2. A discharging conveyance means D discharges the original 5 on the platen 2 after it has been copied. A side edge position aligning means E is provided on the common conveyance passage of both the one-side conveyance means B and the both-side conveyance means C to align the side edge of the original with respect to the original copying position ST on the platen 2.

The paddle feeder A is made of a pair of paddles 12 which are provided over the original exit portion of the original housing tray 4 and project from both the sides of a base 11 so that the paddles can be elastically deformed. The base 11 is rotatably supported by a rotary shaft 13 coupled to a drive motor not shown in the drawings. A retarding pad 15 for preventing several originals 5 from being conveyed together in an overlaid state is provided at the exit portion of the original housing tray 4 so that the pad faces the paddle feeder A.

Figure 2:
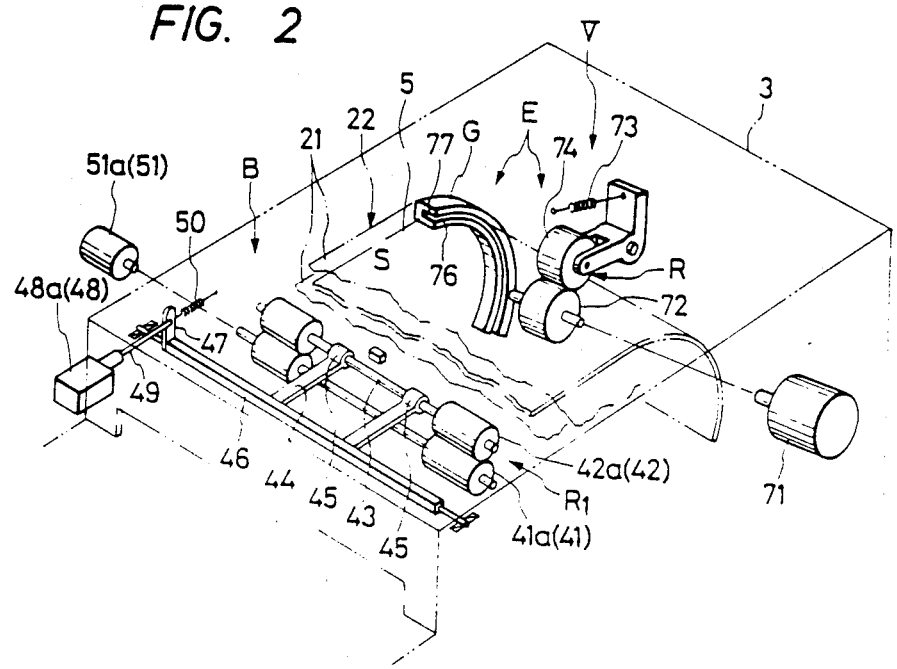
FIG. 2 is cross-sectional view of the device shown in FIG. 1 in the direction of the arrow II.
Figure 3:
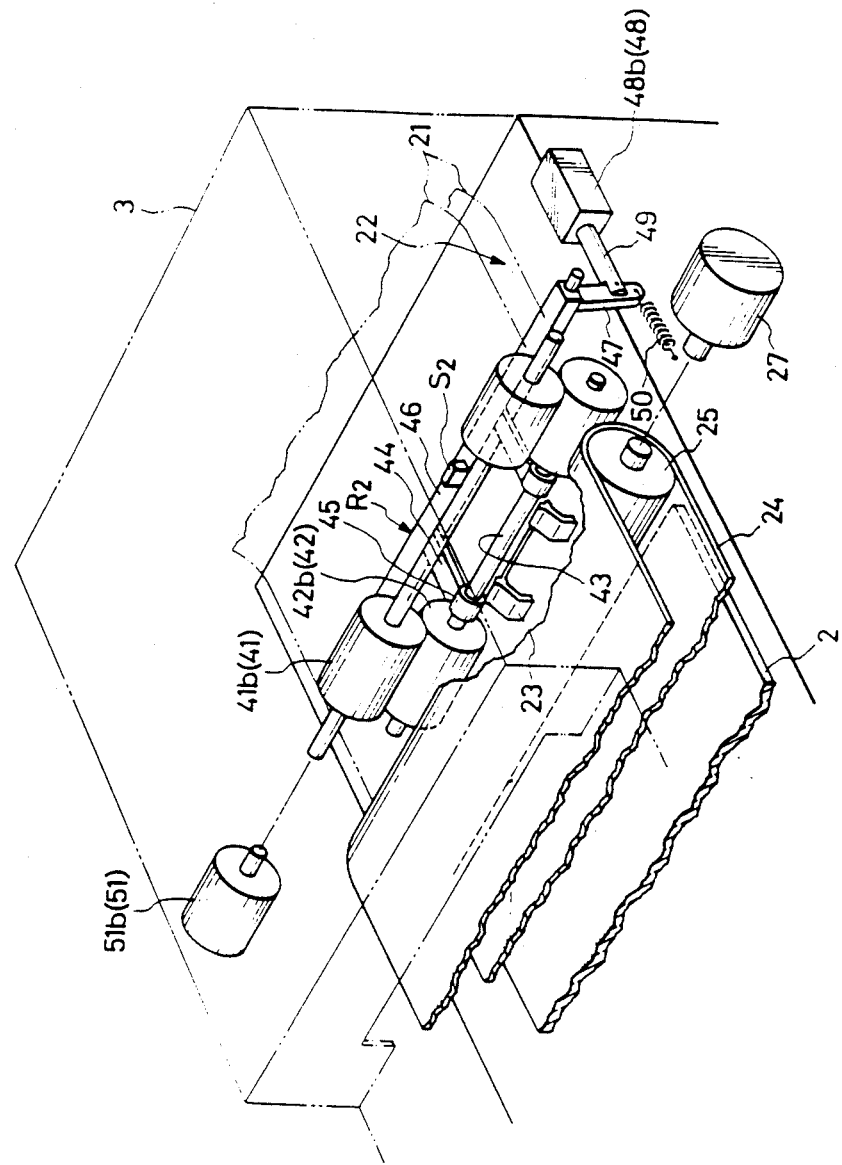
FIG. 3 is a cross-sectional view of the device shown in FIG. 1 in the direction of the arrow III.

As shown in FIGS. 2 and 3, the one-side conveyance means B has a conveyance passage 22 defined by a pair of guide plates 21 and so forth to connect the original exit portion of the original housing tray 4 and the original entrance portion of the platen 2 to each other. A first conveyance roller unit R1 is provided on the conveyance passage 22 near the original housing tray 4. A second conveyance roller unit R2 is provided on the conveyance passage 22 near the platen 2. A gate 23, which can be opened or closed, is provided between the second conveyance roller unit R2 and the platen 2 to adjust the timing of the conveyance of the original 5 to the original copying position ST. An endless conveyance belt 24 is provided over the platen 2 and fitted on a driving roller 25 and a driven roller 26 (FIG. 1) so that the original 5 having proceeded to the platen 2 is moved to the original copying position ST. The driving roller 25 is drivingly connected to a pulse motor 27, which is rotated by driving pulses from a controller 80 described hereinafter.

First and second position sensors S1 and S2 for detecting the position of the front edge of the passing original 5 are provided immediately downstream to the first conveyance roller unit R1, and immediately upstream to the second conveyance roller unit R2, respectively For example, each of the position sensors S1 and S2 is an optical sensor comprising a light emission element and a light reception element.

Figure 4:
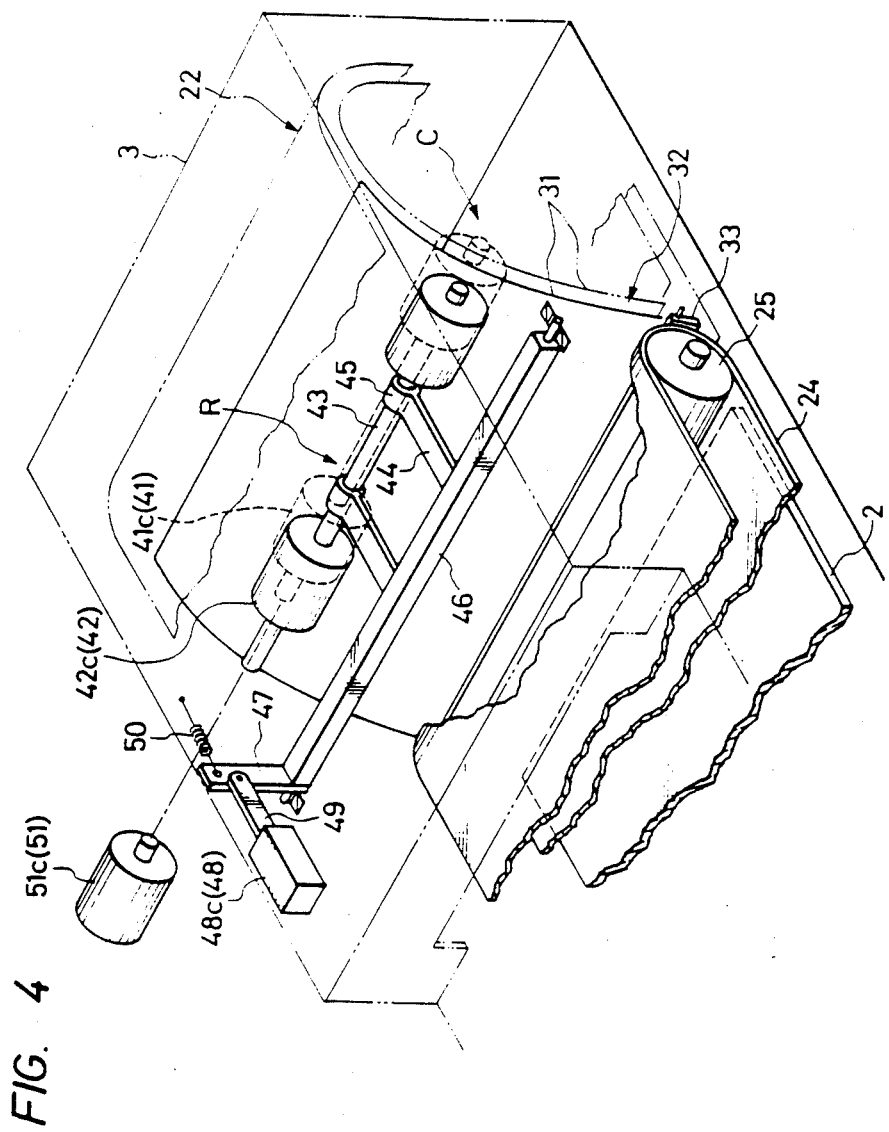
FIG. 4 is a cross-sectional view of the device shown in FIG. 1 in the direction of the arrow IV.

As shown in FIGS. 1 and 4, the both-side conveyance means C has a conveyance passage 32 defined by a pair of guide plates 31. The conveyance passage 32 is branched from the conveyance passage 22 of the one-side conveyance means B near the original entrance portion of the platen 2 and joins the portion of the conveyance passage 22, which is located immediately downstream to the conveyance roller unit R1. A direction changeover gate 33 is provided on the conveyance passage 32 at the original entrance portion (which also functions as an original exit portion in the both-side imaging cycle) of the original and acts so that only the original 5 conveyed out from the original entrance portion of the platen is guided to the conveyance passage 32. A third conveyance roller unit R3 is provided midway on the conveyance passage 32. The portion of the conveyance passage 22, which extends from the end of the conveyance passage 32 to the original entrance portion of the platen 2, the second roller unit R2 located on the conveyance passage 22, the gate 23 for aligning the front edge of the original and the conveyance belt 24 provided over the platen 2 are used for both the one-side copying and both-side copying.

Each of the first, the second and the third conveyance roller units R1, R2 and R3 basically comprises driving rollers 41 (41a, 41b or 41c, specifically) and pinch rollers 42 (42a, 42b or 42c, specifically) located in pressure contact with the driving rollers The support shaft 43 for the pinch rollers 42 is rotatably supported by bearing portions 45 provided at the free ends of a pair of rocking arms 44, each of which is swung about one end thereof as a fulcrum. A lug 47 projecting in the radial direction of a fulcrum shaft 46, which acts as a rocking fulcrum for the rocking arms 44, is provided on the fulcrum shaft at one end thereof. The actuating rod 49 of an electromagnetic actuator 48 (48a, 48b or 48c, specifically) is coupled to the tip of the lug 47. When the actuator 48 is put in action, the actuating rod 49 is retracted to move the rocking arms 44 up or down to separate the pinch rollers 42 from the driving rollers 41. The lug 47 is fitted with a spring 50 urging the lug in such a direction as to protrude the actuating rod 49 of the electromagnetic actuator 48. Shown at 51 (51a, 51b or 51c, specifically) in the drawings is a drive motor for driving the driving rollers 41 in response to a control signal from the controller 80.

As shown in FIG. 1, the discharging conveyance means D is located near the original copying position ST on the platen 2 and comprises the conveyance belt 24, which is also used as a means for discharging the already copied original 5 from an original outlet portion located opposite the original entrance portion of the platen 2, a guide 61 defining a conveyance passage for the discharged original 5, and a discharging roller unit 62 for sending out the original 5 discharged on the guide 61, to a discharge tray 63.

Figure 5:
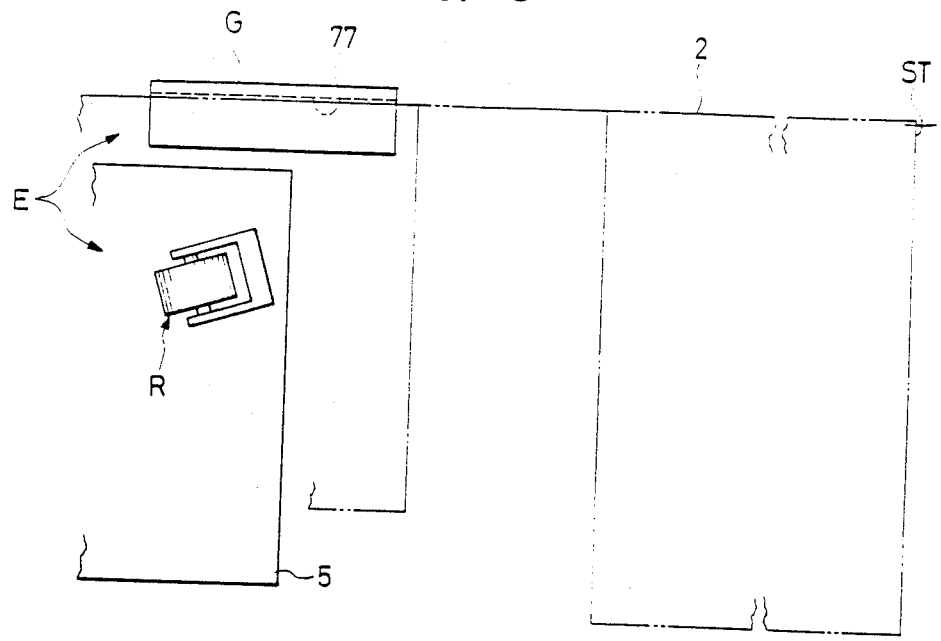
FIG. 5 is a side view of the device shown in FIG. 1 in the direction of the arrow V in FIG. 2.

As shown in FIGS. 2 and 5, the side edge position aligning means E comprises a skewing roller unit R provided on the portion of the conveyance passage 22, which is located downstream to the joint of the conveyance passages 22 and 32 and is jointly used for the one-side conveyance means B and the both-side conveyance means C, and a side guide G located correspondingly to the side edge of the original copying position ST on the platen 2.

The skewing roller unit R comprises a skewing drive roller 72, which is slightly oblique from the direction of conveyance of the original toward the side guide G and is appropriately driven by a skewing drive motor 71, and a skewing pinch roller 74 located in pressure contact with the skewing drive roller by a spring 73. The cross section of the side guide G is shaped nearly as a U. The side guide G is located at one side edge of each of the guide plates 21 defining the conveyance passage 22. The bottom of the groove 76 of the side guide G functions as a side edge aligning surface 77 for the original 5.

Figure 6:
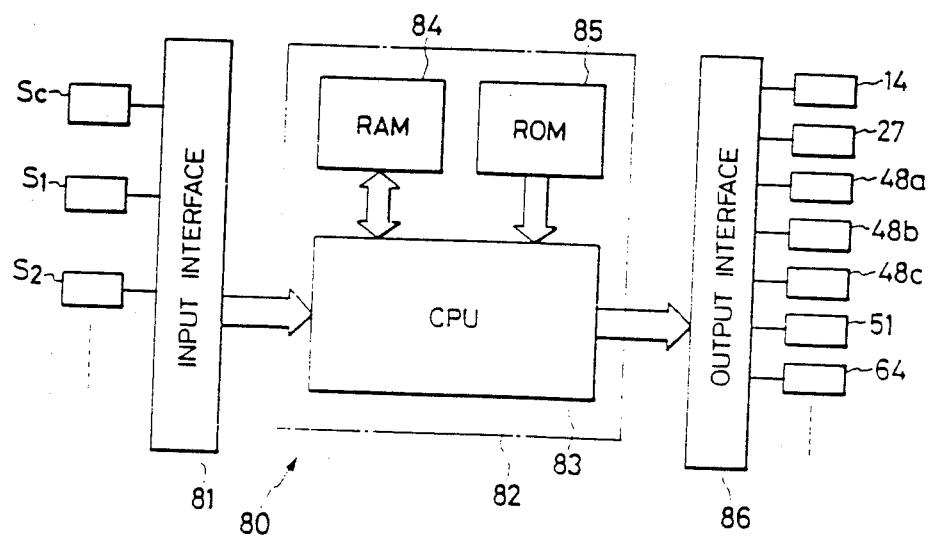
FIG. 6 is a block diagram of the controller of the automatic document conveying device shown in FIG. 1.

The controller 80 comprises a microcomputer as shown in FIG. 6. Signals from a copying switch Sc, the position sensors S1 and S2 and so forth are entered into a control section 82 through an input interface 81. The control section 82 comprises a CPU (central processing unit) 83 for performing processing in the microcomputer, a RAM (random access memory) 84, retrievably stores data for processing, and a ROM (read-only memory) 85 stores a program for controlling the CPU to carry out processing procedures. The program is stored in the ROM 85 beforehand in order to control the conveyance of the original and the timing of copying as shown in a flow chart in FIG. 7. The CPU 83 executes the program on the basis of the signals supplied to the CPU through the input interface 81, and sends out control signals to various devices such as the drive motor 14 for the paddle feeder A, the pulse motor 27 for the conveyance belt 24, the electromagnetic actuators 48a, 48b and 48c for putting the conveyance roller units R1, R2 and R3 into and out of the sheet engaging state, the drive motors 51 for the conveyance roller units R1, R2 and R3, a drive motor 64 for the discharging roller unit 62 of the discharging conveyance means D and various after copying members necessary for copying, to regulate them by the control signals.

Figure 7B:
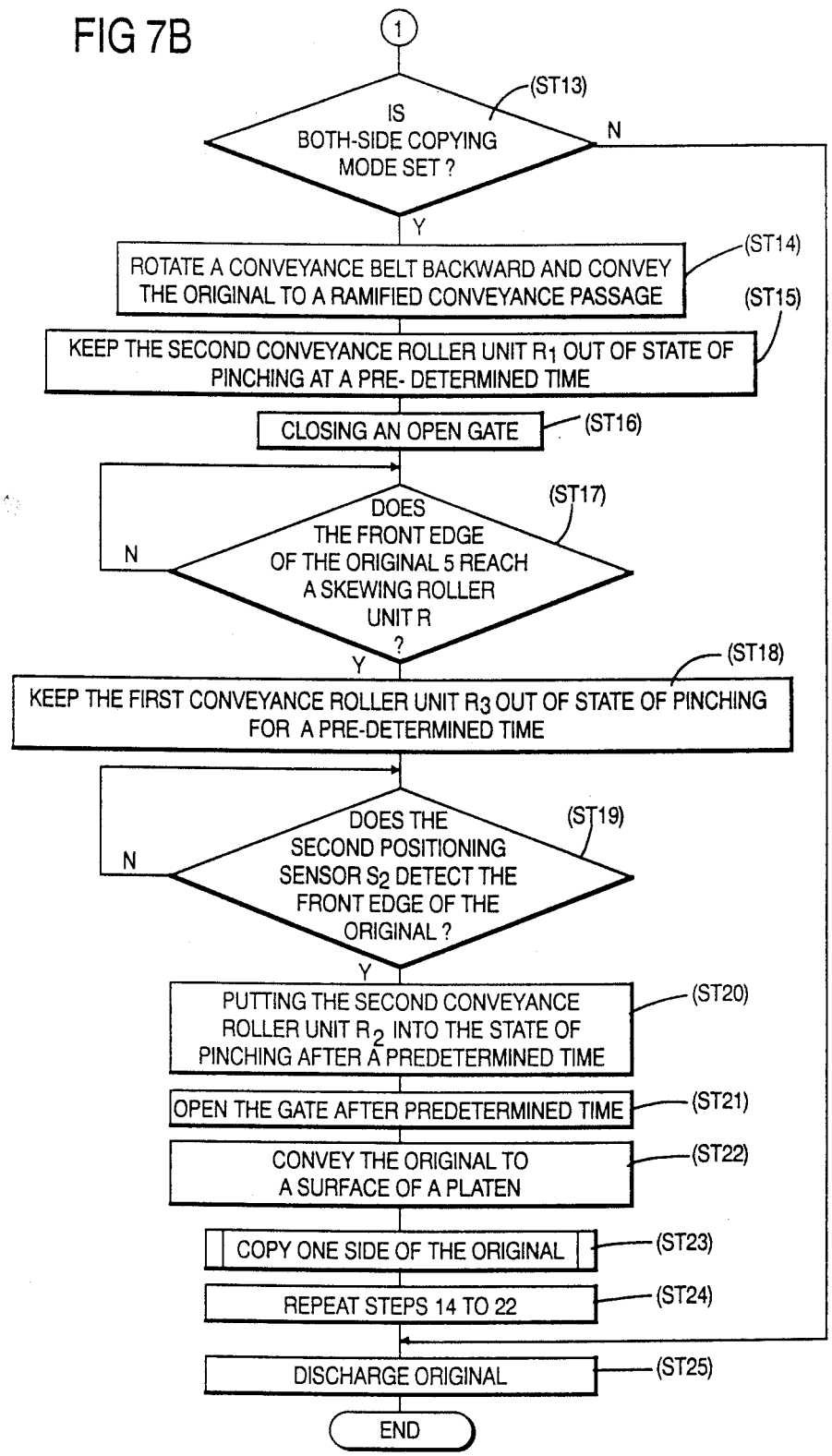

The operation of the automatic original conveyor is now described with reference to the flow chart shown in FIGS. 7A and 7B. When the both-side original 5 is to be copied, the operator selects a both-side copying mode by a mode selection switch not shown in the drawings and then turns on the copying switch Sc. At that time, the control section 82 puts the paddle feeder A and the conveyance roller units R1, R2 and R3 into action in response to the turn-on of the copying switch Sc to start the conveyance of the original 5 in step ST1. As a result, if the original 5 is in a position P1 shown in FIG. 8, the original is sent out by the paddle feeder A and then conveyed by the first conveyance roller unit R1 pinching the original. It is judged by the control section 82 in a step ST2 whether or not the first position sensor S1 has detected the front edge of the original When it is judged by the control section 82 in step ST2 that the first position sensor S1 has detected the front edge of the original 5, the control section stops the movement of the paddle feeder A, puts the conveyance roller unit R2 out of the state of pinching, and closes the open gate 23, in steps ST3, ST4 and ST5. In that stage, the original 5 is conveyed in the conveyance passage 22 by the first conveyance roller unit R1, as shown at P2 in FIG. 8, so that the front edge of the original reaches the skewing roller unit R.

Figure 9:
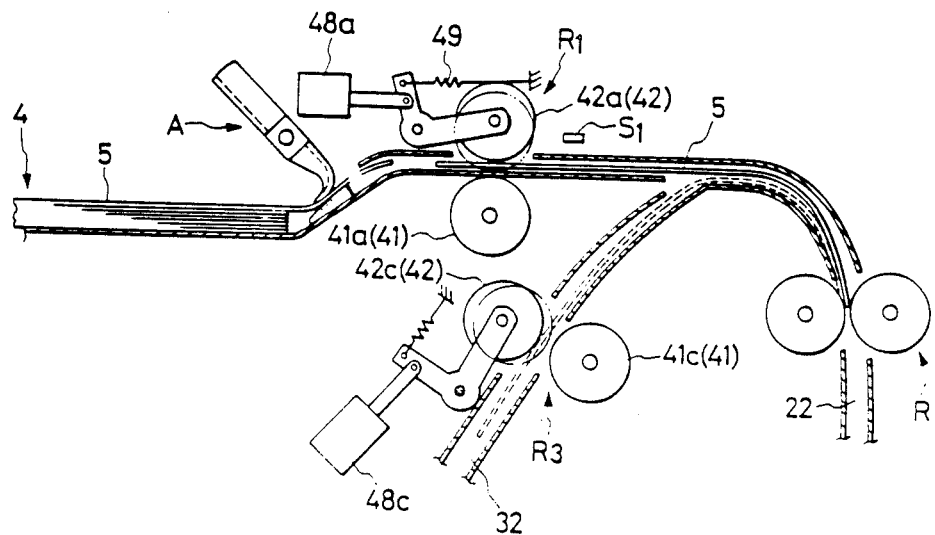
FIG. 9 is a cross-sectional view of the device shown in FIG. 8 in the direction of the arrow IX.

In the meantime, the control section 82 judges, in step ST6, on the basis of the signal from the position sensor S1 and the original conveyance speed of the conveyance roller unit R1, what time the front edge of the original 5 reaches the skewing roller unit R. The control section 82 then separates the pinch roller 42(a) of the first conveyance roller unit R1 from a position shown by an imaginative line in FIG. 9 to a position shown by a full line therein, to keep the first conveyance roller unit R1 out of the state of pinching, for a prescribed time long enough to align the side edge of the original 5 in step ST7. As a result, even if the original 5 in the conveyance passage 22 is in a position not corresponding to the original copying position ST on the platen 2, the original pinched by the skewing roller unit R is skewed from a position shown by a full line in FIG. 5 to a position shown by a chain-dot line therein, toward the side guide G, so that the side edge of the original is aligned to the side edge aligning surface 77 of the side guide. Meanwhile, since the first conveyance roller unit R1 is kept out of the state of pinching, the aligning of the side edge of the original 5 is not hindered even if the rear edge of the original is located at the first conveyance roller unit R1.

Figure 8:
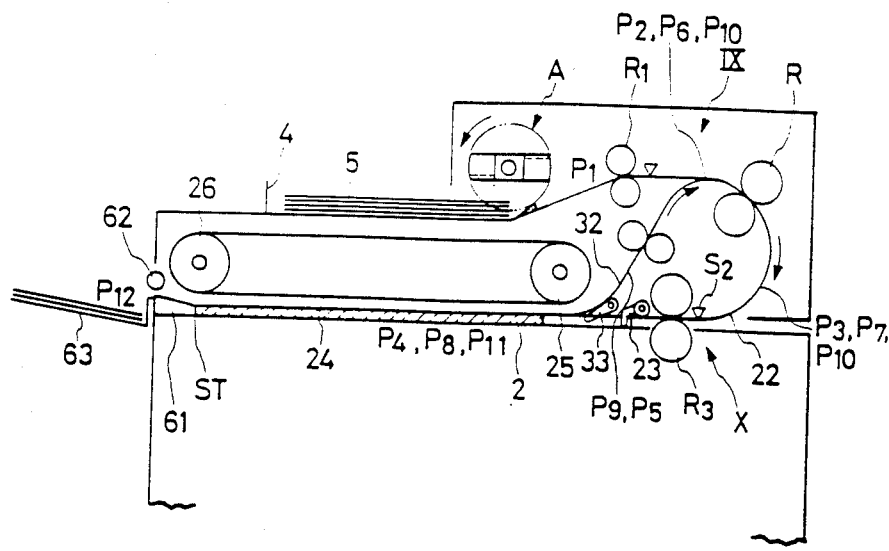
FIG. 8 is a view illustrative of the process of conveyance of an original by the device shown in FIG. 1.
Figure 10:
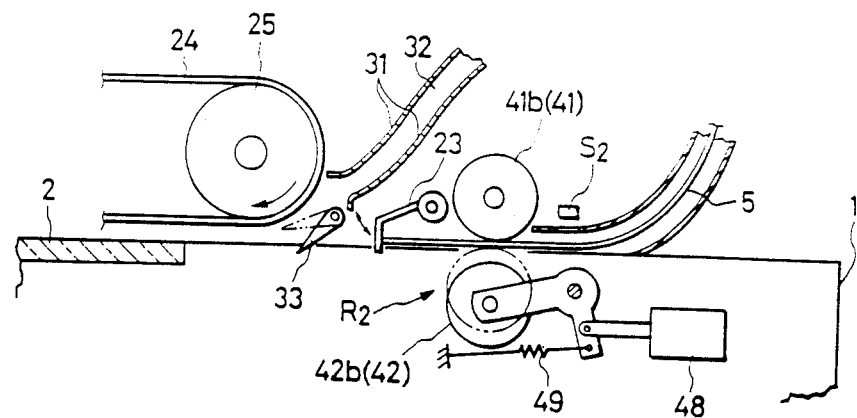
FIG. 10 is a cross-sectional view of the device shown in FIG. 8 in the direction of the arrow X.

The original 5 is thus moved by the skewing roller unit R toward the second conveyance roller unit R2 as shown at P3 in FIG. 8. It is then judged by the control section 82 in step ST8 whether or not the second position sensor S2 has detected the front edge of the original 5. When it is judged by the control section 82 in step ST8 that the second position sensor S2 has detected the front edge of the original 5, the electromagnetic actuator 48b is put out of action when the original has passed through the second conveyance roller unit R2 as shown in FIG. 10. As a result, the pinch roller 42(b) in the position shown by the full line in FIG. 10 is returned to the position shown by the dashed line therein, by the urging force of the spring 49 to put the second conveyance roller unit R2 into the pinching state again in step ST9. When the front edge of the original 5 reaches the gate 23, the gate is opened in step ST10. The original 5 is then conveyed by the second conveyance roller unit R2 as shown at P4 in FIG. 8. The pulse motor 27 for the conveyance belt 24 is driven by a prescribed number of pulses synchronously with the opening of the gate 23 so that the original 5 having proceeded to the surface of the platen 2 is conveyed to the original copying position ST by the conveyance belt 24 in step ST11. The control section 82 then causes a prescribed copying operation to be performed to copy one side of the original on copying paper (which is not shown in the drawings) in step ST12.

After that, it is judged by the control section 82 in step ST13 whether or not the both-side copying mode is set. When it is judged by the control section 82 in step ST13 that the both-side copying mode is not set, an original discharging operation described hereinafter is immediately performed in step ST25. When it is judged by the control section 82 in step ST13 that the both-side copying mode is set, the pulse motor 27 for the conveyance belt 24 is rotated backward by an appropriate number of driving pulses to turn the conveyance belt backward in step ST14 As a result, the original 5 set in the original copying position ST is sent out from the original entrance portion of the platen 2 by the conveyance belt 24 in step ST14. As shown in FIG. 10, the original 5 copied on one side thereof and sent out from the platen 2 as described above is guided to the conveyance passage 32 by a direction changeover gate 33 and pinched by the third conveyance roller unit R3 so that the original reaches a position shown at P5 in FIG. 8. At that time, the control section 82 puts the second conveyance roller unit R2 out of the state of pinching in step ST15 and closes the gate 23 in step ST16, at prescribed timing.

The original 5 pinched by the third conveyance roller unit R3 as described above is conveyed thereby so that the original is moved from the conveyance passage 32 to the conveyance passage 22 as shown at P6 in FIG. 8 and reaches the skewing roller unit R. At that time, the control section 82 judges, in step ST17, on the basis of the time of the start of the backward turning of the conveyance belt 24 what time the front edge of the original shown by a dotted line in FIG. 9 reaches the skewing roller unit R. When the control section 82 has judged in step ST17 what time the front edge of the original 5 reaches the skewing roller unit R, the control section moves the pinch roller 42c of the third conveyance roller unit R3 from a position shown by an imaginative line in FIG. 9 to a position shown by a full line shown therein, to keep the third conveyance roller unit out of the state of pinching, for a prescribed time long enough to align the side edge of the original 5, in step ST18. As a result, even if the original 5 conveyed from the conveyance passage 32 to the conveyance passage 22 is in a position not corresponding to the original copying position ST on the platen 2, as shown in FIG. 5, the original pinched by the skewing roller unit R is skewed from a position shown by a full line in FIG. 5 to a position shown by an imaginative line therein, toward the side guide G so that the side edge of the original is aligned to the side edge aligning surface 77 of the side guide. Meanwhile, since the third conveyance roller unit R3 is temporarily kept out of the pinching state, the aligning of the side edge of the original 5 is not hindered even if the rear edge of the original is located at the third conveyance roller unit R3.

After that, the original 5 conveyed by the skewing roller unit R is moved toward the second conveyance roller unit R2 as shown at P7 in FIG. 8. It is then judged by the control section 82 in step ST19 whether or not the second position sensor S2 has detected the front edge of the original 5. When it is judged by the control section 82 in step ST19 that the second position sensor S2 has detected the front edge of the original 5, the electromagnetic actuator 48b is put out of action when the original has passed through the second conveyance roller unit R2 as shown in FIG. 10, so that the pinch roller 42(b) in a position shown by a full line in FIG. 10 is returned to a position shown by a dashed line shown therein, by the urging force of a spring 49. For that reason, the second conveyance roller unit R2 is put in the state of pinching again in step ST20. When the front edge of the original 5 has reached the gate 23, the gate is opened in step ST21. As a result, the original 5 is conveyed by the second conveyance roller unit R2 as shown at P8 in FIG. 8. The pulse motor 27 for the conveyance belt 24 is driven by a prescribed number of pulses synchronously with the opening of the gate 23 so that the original 5 having proceeded to the surface of the platen 2 is conveyed to the original copying position ST by the conveyance belt in a step ST22. As a result, the other side of the original 5 faces the platen 2, namely, the original is inverted upside down. The control section 82 then acts to perform prescribed copying operation to copy the other side of the original 5 on the copying paper.

The control section 82 thereafter repeats the operations of the steps from ST14 through ST22 again in a step ST24 to move the original 5 as shown at P9, P10 and P11, to invert the original up-side down again After that, the conveyance belt 24 is appropriately moved toward the original discharge port, and the discharge roller 62 is driven so that the original 5 is discharged to a position shown at P12 in FIG. 8, in a step ST25.

Figure 11:
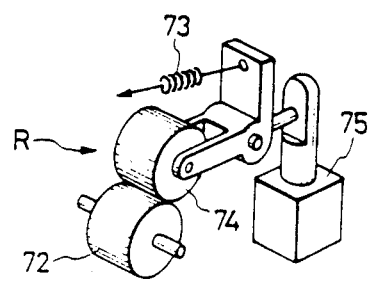
FIG. 11 is a perspective view of a modification of a shared roller unit of the device shown in FIG. 1.

Since the skewing pinch roller 74 is always located in pressure contact with the skewing drive roller 72 in the skewing roller unit R, the surface of the original 5 is rubbed by the contact portion of the skewing roller unit. For that reason, if the original 5 is written with a pencil or the like, the original may be smeared. However, the present invention is not confined to the above-described embodiment but may be otherwise embodied so as to use an electromagnetic actuator 75 as shown in FIG. 11, to temporarily put the skewing roller unit R out of the state of pinching when the original 5 is pinched by the second conveyance roller unit R2, to reduce the chance of smearing of the pencil-written original or the like by the period of time of the non-contact of the skewing roller unit.

In the automatic original document conveying device provided for a duplex machine in accordance with the present invention, even if an original is obliquely conveyed in an original conveyance passage and therefore deviates from an original copying position on a platen, the side edge of the original is aligned to the original copying position by being manipulated in the conveyance passage, as described above. The original is thus precisely placed in the original copying position to prevent faulty imaging from being caused by the positional deviation of the original.

Figure 12:
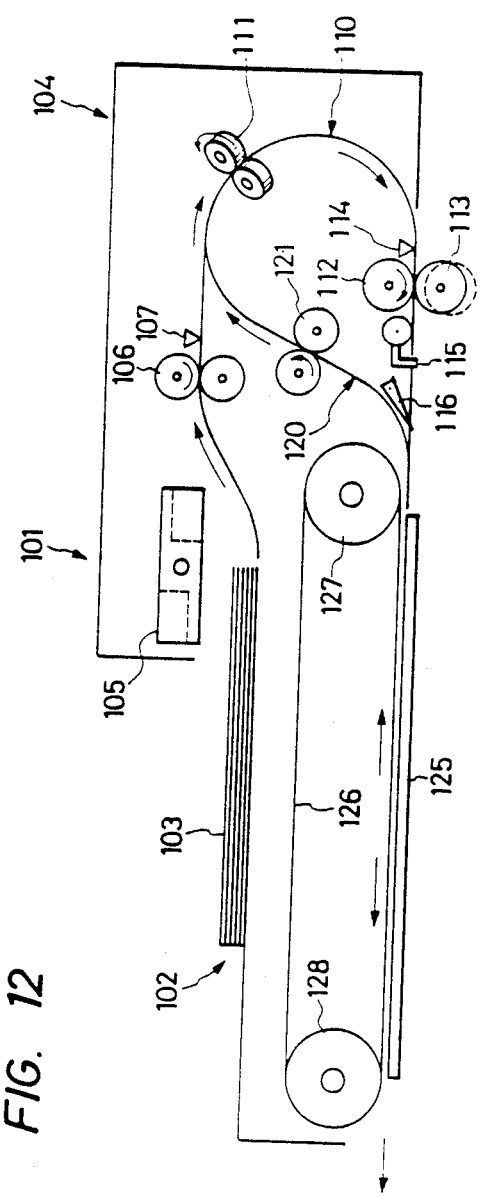
FIG. 12 is another schematic view of an embodiment of the automatic document conveying device of the present invention.
Figure 14:
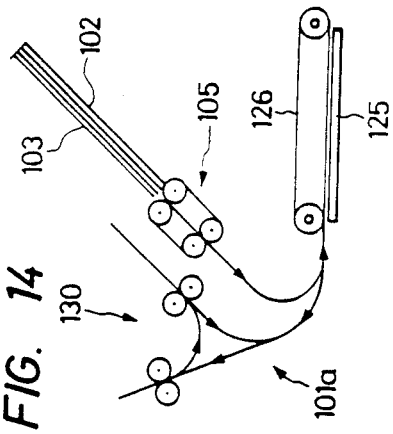
FIG. 14 illustrates the construction of a conventional automatic document conveying device.

A further embodiment of the present invention is shown in FIG. 12 wherein an automatic both-side original conveyor 101 has an original housing tray 102 provided at the upper portion of the body of the conveyor so that an original 3 put in the tray is conveyed to an original conveyance passage.

A U-turn passage 110, which connects the original housing tray 102 to the end of a platen 125, is provided in a cover 104 located at the tray. The U-turn passage 110 is defined by a pair of guide plates provided in the cover 104 and is shaped as a U. The upper end of the U-turn passage 110 is connected to the end of a conveying/positioning unit composed of the platen 125 and an original conveyance belt.

A conveyance roller unit 106 and a sensor 107 are provided at the upstream end of the U-turn passage 110. A skewing roller unit 111 is provided midway at the U-turn passage 110. A conveyance roller unit composed of a conveyance roller 112 and a pinch roller 113, a sensor 114, and a gate 115 are provided upstream to the downstream end of the U-turn passage 110. The original stopped by the gate 115 is detected by the sensor 114 to command the operation of opening the gate 115. The skewing roller unit 111 drives the original into contact with one side wall of the U-turn passage 110 to move the original on the side wall to align the side edge of the original while conveying the original in the U-turn passage 110. If the original is stopped by the gate 115, one side edge of the original is precisely aligned to an image reading unit at the platen.

An original conveyance belt unit 126 is provided over the platen 125 provided over the image reading unit of a copying machine. The original conveyance belt unit 126 is driven backward or forward to convey the original on the platen 125. The belt unit 126 is fitted on a driving pulley 127 and a driven pulley 128. The driving pulley 127 is rotated backward or forward by a driving unit (which is not shown in the drawings) so that the original inserted between the belt and the platen 125 is moved rightward or leftward on the platen 125.

The joint of the U-turn passage 110 and the platen 125 near the downstream end of the U-turn passage is connected to the portion of the U-turn passage near the upstream end thereof by an inverting passage 120 provided with a conveyance roller unit 121 for conveying the original. The conveyance roller unit 121 functions to convey the original from the platen 125 to the upper portion of the U-turn passage 110.

A changeover claw 116 is provided at the joint of one end of the inverting passage 120 and the U-turn passage 110 near the platen 125 so that the changeover claw 116 is swung by a driving member such as a solenoid. However, the present invention is not confined thereto but may be otherwise embodied so that a changeover claw 116 made of a thin plastic sheet such as Mylar is provided to function as a one-way valve, or an optional changeover mechanism is provided.

The other end of the inverting passage 120 is connected to the upper portion of the U-turn passage 110 upstream to the skewing roller unit 111. The side edge of the original introduced into the U-turn passage 110 through the inverting passage 120 is aligned by the skewing roller unit 111.

The operation of the members of the automatic original conveyor in conveying the original is now described. The original 103 is first sent out from the original housing tray 102 to such a location, by a paddle feeder 105, that the original is pinched by the conveyance roller unit 106. When the original is detected by the sensor 107, the paddle feeder 105 is stopped so as not to send out the next original. After that, the conveyance roller unit 106 is put out of state of pinching when the original is conveyed to the skewing roller unit 111, so that the original is conveyed by the skewing roller unit.

The original whose side edge is aligned while the original is conveyed by the skewing roller unit 111 is caused to collide against the closed gate 115 near the downstream end of the U-turn passage 110 so as to be stopped and be skew corrected.

The pinch roller 113 of the conveyance roller unit 112 is swung to pinch the original The gate 115 is opened. The original is then conveyed on the platen 125 by the original conveyance belt unit 126 and stopped in an aligned position. The obverse side of the original is then copied.

After the obverse side of the original is copied, the original conveyance belt unit 126 is revolved in the reverse direction and the changeover claw 116 is swung down so that the original is guided to the inverting passage 120 on the top of the changeover claw 116, conveyed by the conveyance roller unit 121 and moved into the U-turn passage 110. As a result, the original is inverted.

After the original is moved into the U-turn passage 110, the original is subjected again to skew correction by the skewing roller unit 111, temporarily stopped by the gate 115 and conveyed to the platen 125 by the original conveyance belt unit 126 so that the image of the reverse side of the original is read.

After that, the original is conveyed rightward (as to the drawings) again by the original conveyance belt unit 126, moved through the inverting passage 120 and the U-turn passage 110 and conveyed leftward (as to the drawings) on the platen 125 so that the original is discharged into an outside original housing tray.

Figure 13:
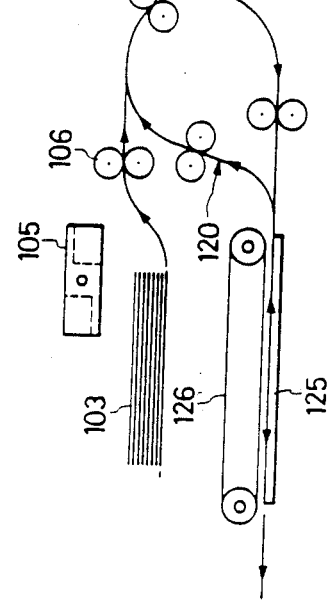
FIG. 13 is a view illustrating the path of movement of an original document during operation of the device shown in FIG. 12.

The above-described series of movement of the original is now described with reference to arrows shown for the original conveyance passages in FIG. 13. Since the original is moved clockwise (as to the drawing) in each of the U-turn passage 110 and the inverting passage 120, each of drive mechanisms for the conveyance roller units, the skewing roller unit and so forth does not need to have a reversible driver or the like. For that season, the operational members such as a driving roller and a skewing roller on the original conveyance passages are rotated only in a single direction, and the rear edge of the original can be easily detected by the sensors. Therefore, only the original conveyance belt unit 126 is provided as a reversible unit in the automatic both-side original document conveying device of the present invention. Since an original conveyance belt unit of such kind is provided as a reversible unit in a conventional automatic original conveyor, the original conveyance belt unit 126 does not need to be specially constituted but may be a conventional one.

In the automatic original document conveying device provided in accordance with the present invention, an original conveyance passage extending from an original housing tray and an inverting passage are jointly used so that the original conveyance passage system of the conveyor is simplified. Since the original is always conveyed in the same direction in each original conveyance passage of the automatic original document conveying device, the drive mechanisms of the original conveyance passages of the conveyor are simplified and a skewing roller unit and a gate can be used for both the copying of both sides of the original document.

What is claimed is:

1. An automatic document conveying device for use in a machine for copying both sides of duplex original documents comprising:
   an original document feeder means for serially feeding one-side and both-side original documents;
   a platen having an original copying position including a side edge;

a substantially U-shaped first conveyance means for conveying an original document to said original copying position;

a second conveyance means for removing from said platen an original document positioned at said original copying position, for inverting said removed original document responsive to the copying of one side thereof, and for conveying said inverted original document to said original copying position; and at least one side edge position aligning means for aligning a side edge of each original document conveyed by said first conveyance means and said second conveyance means with said side edge of said document at said original copying position, wherein said first conveyance means and said second conveyance means includes a common conveyance portion, and wherein said side edge position aligning means is provided in said common conveyance portion.

2. An automatic document conveying device according to claim 1, wherein said side edge position aligning means is provided in said first conveyance means.

3. An automatic document conveying device according to claim 1, wherein said document alignment means comprises:

a skewed roller unit for moving an original document traversing said first conveyance means in a direction oblique to the direction of movement of the document through said first conveyance means, said skewed roller unit including a first skew roller and a second skew roller normally urged in contact with said first skew roller, and electromagnetic means for moving said second skew roller out of contact with said first skew roller when said second pinch roller is in contact with said first pinch roller; and an edge guide disposed in a position to which the original document is moved by said skewed roller unit to align the edge of the document with said edge alignment position of said document copying position.

4. An automatic document conveying device according to claims 2, wherein said side edge position aligning means comprises:

a skewed roller unit for moving an original document traversing said first conveyance means in a direction oblique to said first conveyance means; and a side guide disposed in a position to which said original document is moved by said skewed roller unit to align the side edge of the original document with said side edge of said original copying position.

5. An automatic document conveying device according to claim 4, further including a second side edge position aligning means in said second conveyance means for aligning an original document in said second conveyance means to said side edge of said original copying position.

6. An automatic document conveying device according to claim 4, wherein said original document feeder means comprises a flapper feeder.

7. An automatic document conveying device according to claim 1, further including:

a first conveyance roller unit located in said first conveyance means;

a second conveyance roller unit located is said first conveyance means, said second conveyance roller unit including a first pinch roller and a second pinch normally urged against said first pinch roller to provide a nip action therebetween and means for moving said second pinch roller away from said first pinch roller to release the nip action therebetween;

sensor means for generating a document present signal indicating the presence of an original document in said first conveyance means at the location of said sensor means; and means for controlling said moving means in response to said document present signal to move said second pinch roller away from said first pinch roller to release the nip action therebetween.

8. An automatic document conveying device according to claim 7, wherein said second conveyance roller unit is located is said first conveyance means downstream of said first conveyance roller unit.

9. An automatic document conveying device according to claim 8, wherein said sensor means is located between said first conveyance roller unit and said second conveyance roller unit.

10. An automatic document conveying device according to claim 7, wherein said sensor means is located between said first conveyance roller unit and said second conveyance roller unit.

11. An automatic document conveying device according to claim 7, wherein said document alignment means comprises:

a skewed roller unit for moving an original document traversing said first conveyance means in a direction oblique to the direction of movement of the document through said first conveyance means, said skewed roller unit including a first skew roller and a second skew roller normally urged in contact with said first skew roller, and electromagnetic means for moving said second skew roller out of contact with said first skew roller when said second pinch roller is in contact with said first pinch roller; and an edge guide disposed in a position to which the original document is moved by said skewed roller unit to align the edge of the document with said edge alignment position of said document copying position.

12. An automatic document conveying device for use in a machine for copying both sides of duplex original documents comprising:

an original document feeder means for serially feeding one-side and both-side original documents;

a platen having an original copying position including a side edge;

a first conveyance means for conveying an original document to said original copying position, wherein said first conveyance means includes a U-shaped document path for conveying an original document from said original document feeder means to said original copying position;

a second conveyance means for removing from said platen an original document positioned at said original copying position, for inverting said removed original document responsive to the copying of one side thereof, and conveying said inverted original document to said original copying position; and at least one side edge position aligning means for aligning a side edge of each original document conveyed by said first conveyance means and said second conveyance means with said side edge of said document at said original copying position, wherein said first conveyance means and said second conveyance means includes a common conveyance portion, and wherein said side edge position aligning means is provided in said common conveyance portion.

13. An automatic document conveying device according to claim 12, wherein said second conveyance means comprises a document inverting path for conveying a document from said original original copying position to the beginning of said U-shaped document path to invert said conveyed original document.

14. An automatic original document conveying device according to claim 13, further including sensor means provided in said first conveyance means and said second conveyance means for generating output signals to indicate the position of an original document therein.

15. An automatic original document conveying device according to claim 14, further including processor means for controlling said first conveyance means and said second conveyance means responsive to said output signals to convey a document therein.

16. An automatic both-side original document conveying device for conveying a duplex original document from a serial document feeder to a copying position on a platen comprising:
- an original conveyance belt provided over the platen and being driveable in a forward direction and a reverse direction;
- an original conveyance path for conveying during a first operating mode of the conveying device an original document from the document feeder to the copying position;
- an inverting conveyance passage for conveying during a second operating mode of the conveying device an original document from the copying position to a predetermined location of the original conveyance passage to invert the conveyed original document, wherein said original conveyance path is substantially U-shaped and includes a feed port and a discharge port, and wherein said predetermined location is located adjacent said feed port of said original conveyance passage;
- side edge position aligning means in said original conveyance passage for aligning an edge of a document in said original conveyance passage with a predetermined alignment position; and
- belt driving means for driving said original conveyance belt in said forward direction during operation of the conveying device in the first operation mode and in said reverse direction during operation of the conveying device in said second operation mode.

17. An automatic document conveying device for use in a machine for copying both sides of duplex original documents comprising:
- means for serially feeding the document;
- a document copying position having an edge alignment position;
- a document conveyance means for conveying the documents from said feeding means to said document copying position, said document conveyance means being substantially U-shaped and having a first end for receiving documents from said feeding means and a second end for discharging documents to said document copying position;
- document inverting means for conveying documents from said document copying position to said first end of said document conveyance means to invert the documents; and
- document alignment means in said substantially U-shaped document conveyance means for aligning an edge of each document conveyed by said document conveyance means with said edge alignment position of said document copying position.

18. An automatic document conveying device according to claim 1, or 17, wherein said document alignment means comprises:
- a skewed roller unit for moving an original document traversing said document conveyance means in a direction oblique to the direction of movement of the document through said document conveyance means; and
- an edge guide disposed in a position to which the original document is moved by said skewed roller unit to align the edge of the document with said edge alignment position of said document copying position.

19. An automatic document conveying device according to claim 17, further including:
- a first conveyance roller unit located in said document conveyance means;
- a second conveyance roller unit located is said document conveyance means, said second conveyance roller unit including a first pinch roller and a second pinch normally urged against said first pinch roller to provide a nip action therebetween and means for moving said second pinch roller away from said first pinch roller to release the nip action therebetween;
- sensor means for generating a document present signal indicating the presence of an original document in said document conveyance means at the location of said sensor means; and
- means for controlling said moving means in response to said document present signal to move said second pinch roller away from said first pinch roller to release the nip action therebetween.

20. An automatic document conveying device according to claim 19, wherein said second conveyance roller unit is located is said document conveyance means downstream of said first conveyance roller unit.

21. An automatic document conveying device according to claim 20, wherein said sensor means is located between said first conveyance roller unit and said second conveyance roller unit.

22. An automatic document conveying device according to claim 19, wherein said sensor means is located between said first conveyance roller unit and said second conveyance roller unit.

23. An automatic document conveying device according to claim 19, wherein said document alignment means comprises:
- a skewed roller unit for moving an original document traversing said document conveyance means in a direction oblique to the direction of movement of the document through said document conveyance means, said skewed roller unit including a first skew roller and a second skew roller normally urged in contact with said first skew roller, and electromagnetic means for moving said second skew roller out of contact with said first skew roller when said second pinch roller is in contact with said first pinch roller; and
- an edge guide disposed in a position to which the original document is moved by said skewed roller unit to align the edge of the document with said edge alignment position of said document copying position.

24. An automatic document conveying device according to claim 17, wherein said document alignment means comprises:
   a skewed roller unit for moving an original document traversing said document conveyance means in a direction oblique to the direction of movement of the document through said document conveyance means, said skewed roller unit including a first skew roller and a second skew roller normally urged in contact with said first skew roller, and electromagnetic means for moving said second skew roller out of contact with said first skew roller when said second pinch roller is in contact with said first pinch roller; and
   an edge guide disposed in a position to which the original document is moved by said skewed roller unit to align the edge of the document with said edge alignment position of said document copying position.

* * * * *

UNITED STATES PATENT AND TRADEMARK OFFICE
CERTIFICATE OF CORRECTION

PATENT NO. : 4,984,779
DATED : January 15, 1991
INVENTOR(S) : Yasuo Iwasaki It is certified that error appears in the above-identified patent and that said Letters Patent is hereby corrected as shown below:

Claim 4, column 13, line 43, change "claims" to --claim--;

Claim 7, column 13, line 65, change "is" to --in--;

Claim 8, column 14, line 15, after "located" change "is" to --in--;

UNITED STATES PATENT AND TRADEMARK OFFICE
CERTIFICATE OF CORRECTION

PATENT NO. : 4,984,779
DATED : January 15, 1991
INVENTOR(S) : Yasuo Iwasaki

It is certified that error appears in the above-identified patent and that said Letters Patent is hereby corrected as shown below:

Claim 13, column 15, line 8, delete "original" (second occurence only);

Claim 19, column 16, line 23, change "is" to --in--;

Claim 20, column 16, line 42, after "located" change "is" to --in--.

Signed and Sealed this

Ninth Day of March, 1993

*Attest:*

STEPHEN G. KUNIN

*Attesting Officer*  *Acting Commissioner of Patents and Trademarks*